United States Patent [19]

Parker

[11] 4,045,903
[45] Sept. 6, 1977

[54] ARTIFICIAL FISHING LURE

[76] Inventor: Douglas W. Parker, 2720 S. Waldron Road, Fort Smith, Ark. 72901

[21] Appl. No.: 654,071

[22] Filed: Feb. 2, 1976

[51] Int. Cl.² .............................................. A01K 85/00
[52] U.S. Cl. .................................. 43/42.11; 43/42.09;
43/42.28; 43/42.31; 43/42.37; 43/42.39;
43/42.48
[58] Field of Search ................. 43/42.11, 42.13, 42.37,
43/42.45, 42.48

[56] References Cited

U.S. PATENT DOCUMENTS

| 1,483,842 | 2/1924 | Carter | 43/42.48 |
| 1,898,740 | 2/1933 | Novitzky | 43/42.45 |
| 2,542,429 | 2/1951 | Perry | 43/42.48 |
| 2,542,776 | 2/1951 | Key | 43/42.48 |
| 3,253,363 | 5/1966 | Steehn | 43/42.13 |
| 3,497,987 | 3/1970 | Perrin | 43/42.37 X |
| 3,855,722 | 12/1974 | Moore | 43/42.37 X |

Primary Examiner—Louis G. Mancene
Assistant Examiner—Daniel J. Leach

[57] ABSTRACT

An artificial fishing lure which simulates the appearance of live bait swimming in the water. The leading end of the lure is provided with a symmetrical scoop configuration and a transverse trough which together cause the lure to roll and pivot in the water. A spinner assembly for the lure includes a spinner blade and a harness to which the lure is attached in a flexible manner to permit it to move with a swimming type motion.

9 Claims, 8 Drawing Figures

ARTIFICIAL FISHING LURE

BACKGROUND AND SUMMARY OF THE INVENTION

This invention relates in general to artificial fishing lures and deals more specifically with an underwater lure that moves in a manner to simulate live bait swimming through the water.

It has long been recognized that fish are attracted to artificial lures that appear to be swimming in the water. Accordingly, lures have been constructed in various configurations to achieve different motions or vibrations as the lure is pulled through the water. For the most part, however, such lures have not been completely successful in duplicating a truly life-like swimming action necessary for a realistic imitation of live, natural bait.

It is also well-known that fishing lures known as spinners are particularly attractive for certain fish. Conventional spinner lures include a weighted head with a hook, a shiny metal spinner blade, and a harness which is embedded in the head and which carries the spinner blade. When pulled through the water, the only extra motion of the lure is the rotation of the blade on the harness.

It has been proposed, for example in U.S. Pat. No. 3,747,256, to mount the head of the lure by means of a flexible-type joint to the harness so that it is able to wiggle slightly as it is pulled through the water. However, the action is uncontrolled and does not simulate the swimming motion of natural bait.

It is an important object of the present invention to provide an underwater fishing lure having a unique configuration that enables it to simulate, in a realistic manner, the motion of live bait swimming through the water. In this regard, it is a significant feature of the invention that the lure moves from side to side and simultaneously rolls about its axis as it travels through the water.

It is another object of the invention to provide a fishing lure of the character described that is life-like in appearance in order to be visually attractive to fish.

A further object of the invention is to provide a fishing lure of the character described that includes a source of sound for attracting fish.

An additional object of the invention is to provide a fishing lure of the spinner type that includes a spinner blade and a life-like head which is flexibly mounted on a spinner harness to permit it to realistically imitate live bait swimming in the water.

Yet another object of the invention is to provide a fishing lure of the spinner type wherein the head may be quickly and easily removed from the harness for use by itself, or to substitute a different head on the harness.

Other and further objects of the invention, together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views.

Figure 1:
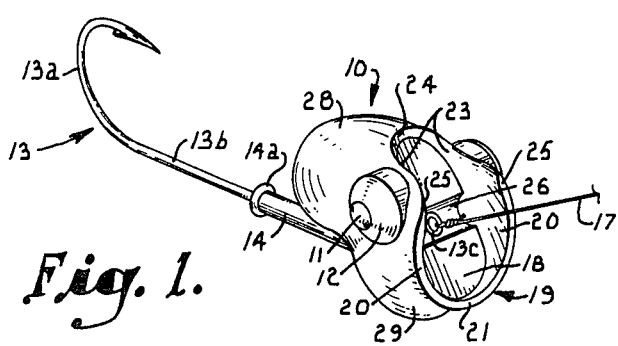
FIG. 1 is a perspective view illustrating an artificial fishing lure constructed according to the invention attached to the end of the fishing line.

Referring now to the drawings in detail and initially to FIGS. 1-5, the body of a fishing lure constructed according to the invention is generally designated by reference numeral 10. The lure body 10 is symmetrical about a central vertical plane passing longitudinally through the body from front to rear. The lure body is preferably constructed from a pair of molded plastic halves which are glued or otherwise secured together along a central seam extending longitudinally of the lure.

Each half of the lure is provided on the side with an outwardly projecting eye structure which includes a cylindrical projection 11 having a rounded outer end that forms the pupil portion of the eye. An annular plastic ring 12 having a convex outer surface is fit over each projection 11 and secured in place to form the iris portion of the eye around the pupil. Each ring 12 is preferably colored to contrast sharply with the color of the pupil.

Figure 2:
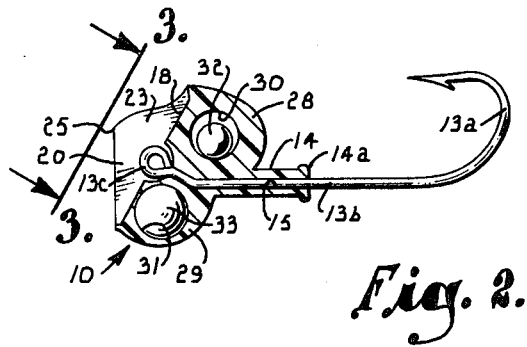
FIG. 2 is a side sectional view of the lure.

The lure is equipped with a fish hook 13 having a curved hook portion 13a, a shank 13b and an eyelet 13c. The shank 13b is sharply bent near the eyelet 13c and extends through the lure body; the bent region of the shank 13b prevents the hook 13 from turning within the lure body. As best illustrated in FIG. 2, the lure body includes an integral cylindrical barrel portion 14 which projects to the rear, having an enlarged collar 14a on its rearward end. The lure body is formed with a central bore 15 which also extends through barrel 14 and which receives the hook shank 13b. The circular eyelet or loop 13c is formed on the forward end of the fish hook 13 to permit connection with conventional fishing line 17, or with a spinner harness that will be described. The barb of the hook is oriented upwardly through the water to minimize snagging brush, rocks and like obstructions.

Figure 3:
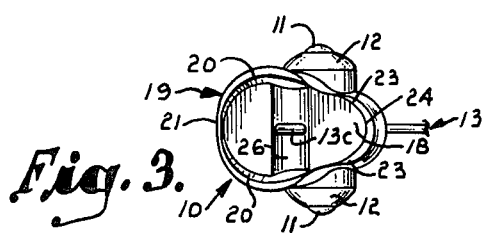
FIG. 3 is a front view of the lure taken generally along line 3—3 of FIG. 2 in the direction of the arrows.

The forward or leading end of the lure body is constructed with a scoop like configuration which causes the lure to roll and to pivot from side to side so as to simulate live bait swimming through the water. As best illustrated in FIGS. 1 and 3, a substantially flat, but inclined forward surface 18 of the lure is recessed within a peripheral flange or rim 19 that extends completely around surface 18 in forward projection therefrom. Surface 18 and rim 19 are both symmetrical about a vertical center line.

The lower section of rim 19 is in the general shape of a horseshoe when viewed from the front. Bow shaped side walls 20 of the lower rim section curve gradually inwardly at their lower ends to form a smoothly curved bottom portion 21 of the rim. In addition, the lower side walls 20 diverge slightly away from one another in flared fashion as they extend away from surface 18. The forward edges of side walls 20 and portion 21 are flattened to present blunt edges. The edges of side walls 20 are oriented substantially vertically when the lure moves through the water.

The upper section of rim 19 includes upper side walls 23 which join integrally with the lower side walls 20. As best shown in FIG. 3, the upper side walls 23 are spaced more closely from one another than the spacing between the lower side walls 20. The spacing between the upper side walls 23 progressively decreases toward the top of the lure, and the upper side walls merge to form a smoothly curved top portion 24 of rim 19. The leading edges of the upper side walls 23 are formed sharply. The edges of upper side walls 23 are contoured somewhat as shown in FIG. 2, and these edges are oriented to extend upwardly and rearwardly from their junctions with the edges of the lower side walls 20, preferably at an angle of approximately 60° from vertical. The junctions between the outer edges of side walls 20 and those of walls 23 are preferably rounded somewhat and may be turned inwardly as indicated at 25.

As previously indicated, surface 18 is recessed rearwardly of the leading edges of rim 19. Surface 18 is inclined at an angle preferably of between 20° and 40° rearwardly from vertical when the lure travels through the water, as best shown in FIG. 2. The extreme lower end of surface 18 is recessed only slightly to the rear of rim portion 21, and the upper end of surface 18 is recessed only slightly to the rear of the upper rim portion 24. The remainder of surface 18 is recessed to a greater extent rearwardly of the leading edges of rim 19 due to the configuration of the rim.

The shape of surface 18 is best illustrated in FIG. 3 which shows the lure rotated 90° clockwise from its normal orientation in the water. The width of surface 18 decreases in a gradual manner from bottom to top, and the lower portion of the surface is thus wider than the upper portion. This narrowing of the width of surface 18 from bottom to top is due to the shape of rim 19 and the greater spacing between the lower side walls 20 in comparison to the spacing between the upper side walls 23.

At a substantially central location along the height of surface 18, a transverse trough 26 is formed therein. The walls that define trough 26 are smoothly curved in the manner of a semi-cylindrical surface in order to effectively accommodate water flow in the trough. Trough 26 extends between the side walls of rim 19 at a location where the side walls have their greatest extension forwardly of surface 18. The connection loop 13c on the end of hook 13 is located in trough 26 at a substantially central location on surface 18.

The rearward or trailing portion of the lure body is formed in a shape that enhances the swimming motion of the lure. An upper protuberant portion 28 is centered directly above barrel 14 and is smoothly curved on its exterior surface. The top surface of portion 28 does not project above the upper rim portion 24. A lower protuberant portion 29 of the lure body is centered below barrel 14. Portion 29 does not project to the rear as far as portion 28. The surface of portion 29 is also smoothly curved or contoured. Both protuberant portions 28 and 29 are lesser in width than the distance between the lower side walls 20 of rim 19, and both protuberant portions taper gradually in width from front to rear.

With reference now to FIG. 2, a pair of spherical internal cavities 30 and 31 are formed within the lure body in portions 28 and 29, respectively. A pellet 32 is located within cavity 30 and is smaller in size than the cavity in order to produce a rattling sound audible to fish as it collides with the walls surrounding the cavity. A weighted sphere 33 is positioned closely within cavity 31 in order to weight the lure sufficiently to maintain it at the desired depth in the water.

In use, the fishing line 17 is tied to loop 13c and the lure body travels through the water in the orientation shown in FIG. 2. At this orientation, surface 18 is inclined rearwardly at an angle of approximately 30°. Since surface 18 presents the only significant surface area facing in the direction of travel, the water pressure acts almost entirely against surface 18. The side walls 20 and 23 assist in directing the water against surface 18 and assure that the water does not flow over the side edges of the surface to any substantial extent.

Figure 4:
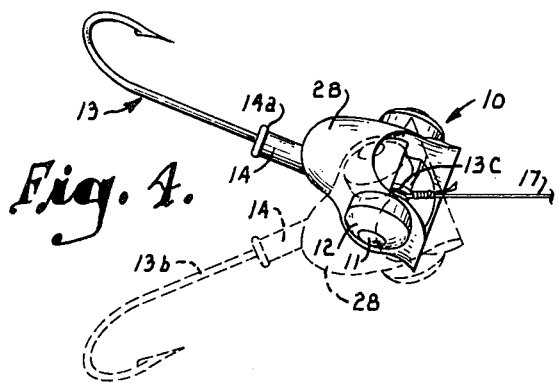
FIG. 4 is a top plan view of the lure with the broken lines indicating side to side pivotal movement of the lure.

The water acting against the lower portion of surface 18 moves upwardly along the inclined surface toward the top thereof. The water pressure acting outwardly against side walls 20 and 23 exerts forces that cause the lure to move from side to side about a vertical axis passing through the connection loop 13c, as shown in FIG. 4. As this occurs, the curved, symmetrical shape of walls 20 and 23 stabilizes the lure such that it oscillates back and forth rather than moving only to one side. Trough 26 increases the side to side motion of the lure and assures that it occurs as intended. Since the trough extends between the side walls of rim 19 at their area of greatest forward projection, the trough channels a large amount of water against the largest areas of the walls and thus increases the force of the water that acts against the walls. This in turn results in an increase in the forces which tend to oscillate the lure in side to side motion.

Figure 5:
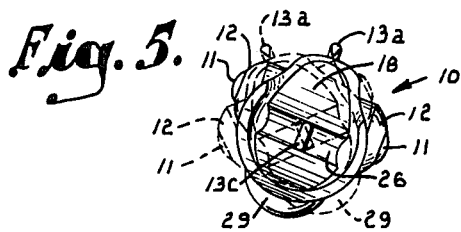
FIG. 5 is a front elevational view taken from the right end of FIG. 4, with the broken lines indicating rolling movement of the lure about its longitudinal axis.

At the same time, the progressive narrowing of surface 18 from bottom to top leads to a pressure differential between the upper and lower portions of the surface. This pressure differential causes the water to exert different sideward forces against the upper side walls 23 than against the lower side walls 20. Consequently, the lure rolls back and forth about its longitudinal axis as it travels through the water. As illustrated in FIG. 5, the lure oscillates back and forth through an arc of approximately 45°. Again, the transverse trough 26 enhances the rolling motion of the lure, and the curved symmetrical side walls of rim 19 serve a stabilizing function to prevent the lure from rolling excessively in one direction.

Figure 6:
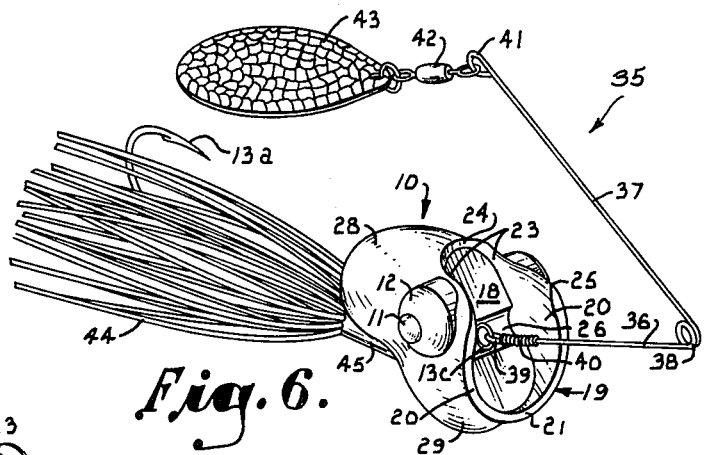
FIG. 6 is a perspective view illustrating the lure of the present invention equipped with a skirt and attached to a spinner harness.

Turning now to FIG. 6, a spinner harness that may be used with lure 10 is designated by numeral 35. Harness 35 includes a pair of legs 36 and 37 which are connected in a V shape. A circular eye or loop 38 is formed at the vertex of the V for attachment to a fishing line. A loop 39 is formed on the end of leg 36 for flexible connection to the loop 13c of the lure. A small spring 40 is slipped over the free end of leg 36 and the adjacent portion of the leg in order to secure loop 39 to loop 13c. Spring 40 may be slid along leg 36 to release the free end of the leg and thus permit disconnection of loop 39 from loop 13c. Loops 13c and 39 are large enough to permit the lure to roll through an arc of at least 45° about the axis of leg 36.

The other harness leg 37 is looped at 41 on its end to receive a swivel connection 42. Swivel 42 mounts a shiny, spoon shaped spinner blade 43 in a manner to permit the blade to spin on swivel 42 in the usual manner. A skirt 44 is formed from a plurality of strands of flexible material such as plastic or the like. Skirt 44 has a cylindrical collar 45 on its forward end which is fit closely over barrel 14 of the lure. As the lure travels through water, the flexible skirt 44 fills out around the fish hook 13 to substantially conceal the hook.

Lure 10 may be attached to harness 35 by connecting loops 13c and 39 and securing them together by means of spring 40. Loop 38 is then connected to a fishing line. As the lure and spinner move through the water, the lure pivots from side to side and also rolls about the axis of leg 36 in the manner previously described. It is again pointed out that the flexible connection between loops 13c and 39 permits the rolling motion of the lure and also the side to side pivotal motion thereof. Spinner blade 43 spins on the swivel 42 to assist in attracting fish.

Figure 7:
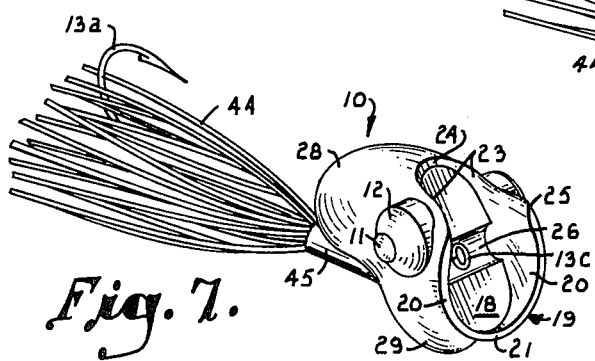
FIG. 7 is a perspective view illustrating the lure equipped with a skirt only.

The realistic swimming motion of the lure 10 in coopertion with the spinner blade 43 has been found to be highly appealing bait for attracting fish. Likewise, the lure 10 may be beneficially used without a spinner harness. As shown in FIG. 7, the lure may be dressed with a skirt 44, pork rind, or similar adornments used by fishermen and then tied directly to fishing line at the eyelet 13c to achieve the simultaneous rolling and pivotal motions creating the realistic swimming action of the lure.

Figure 8:
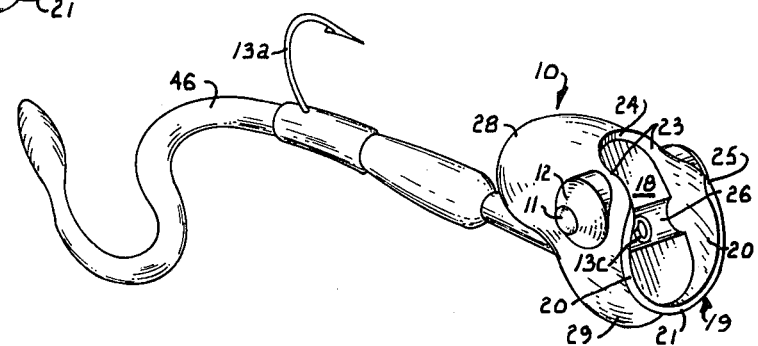
FIG. 8 is a perspective view illustrating the lure equipped with an artificial, flexible worm.

With reference to FIG. 8, skirt 44 may be removed and replaced by an artifical worm 46. The forward end of the worm is fit over barrel 14 and over the hook shank 13b. The worm is formed of a flexible substance so that it will wiggle as the lure moves through the water in an undulating, swimming motion.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An underwater fishing lure comprising:
   a lure body having a leading end when traveling through water;
   a substantially flat surface on the leading end of said lure body, said surface being inclined from vertical at a rearwardly inclined angle from bottom to top of the surface when the lure travels through water;
   a rim section extending substantially around the periphery of said surface and projecting forwardly thereof, said rim section including a pair of spaced side walls projecting forwardly on opposite sides of said surface; and
   a semicircular trough extending between said side walls and presenting a generally transverse recess in said surface for directing water against said side walls to simultaneously create a side-to-side movement about the vertical axis of the lure and an oscillating movement about the longitudinal axis of the lure when traveling through water.

2. A fishing lure as set forth in claim 1, wherein said surface presents a gradually narrowing width from bottom to top and said side walls are spaced progressively more closely together from bottom to top.

3. A fishing lure as set forth in claim 1, wherein the side walls of said rim section define lower portions and upper portions forming integral extensions of said lower portions, the lower portions of said side walls having forward edges oriented substantially vertically when the lure travels through water.

4. A fishing lure as set forth in claim 3, wherein the lower portions of said side walls join together in a smoothly curved manner at the bottom of said surface.

5. A fishing lure as set forth in claim 4, wherein the upper portions of said side walls join together in a smoothly curved manner at the top of said surface.

6. A fishing lure as set forth in claim 1, wherein said lure body includes a trailing portion when traveling through water, said trailing portion including on the upper portion thereof a bulging protuberance having a smoothly curved exterior surface.

7. A fishing lure as set forth in claim 6, including a second bulging protuberance having a smoothly curved exterior surface, said second protuberance being located on the trailing portion of said lure body below the first mentioned protuberance, the first protuberance projecting further to the rear than said second protuberance.

8. An underwater fishing lure comprising:
   a lure body having a leading end when traveling through water;
   a substantially flat surface on the leading end of said lure body, said surface being inclined from vertical at a rearwardly inclined angle from bottom to top of the surface when the lure travels through water;
   a rim section extending substantially around the periphery of said surface and projecting forwardly thereof, said rim section including a pair of spaced side walls projecting forwardly on opposite sides of said surface;
   trough means presenting a generally transverse recess in said surface for directing water against said side walls;
   a harness having first and second legs terminating in respective end portions spaced apart from one another;
   a spinner member mounted to swivel on the end portion of said first leg; and
   flexible means for attaching said lure body to the end portion of said second leg in a manner permitting said lure body to roll about the axis of said second leg and to pivot thereon.

9. A fishing lure as set forth in claim 8, wherein said flexible means includes interconnected loops on said lure body and second harness leg, said loops being loosely interconnected for relative pivotal movement through an arc of at least 45° with respect to the axis of said second leg.

* * * * *